(12) United States Patent
Li et al.

(10) Patent No.: US 11,912,327 B2
(45) Date of Patent: Feb. 27, 2024

(54) FOLDING PALLET TRUCK

(71) Applicant: NINGBO RUYI JOINT STOCK CO., LTD, Ningbo (CN)

(72) Inventors: Jiaxing Li, Ningbo (CN); Ji Chen, Ningbo (CN); Ticheng Zhang, Ningbo (CN); Wei Zhang, Ningbo (CN); Haoxiang Fang, Ningbo (CN); Chunbo Chu, Ningbo (CN); Yuanjun Ye, Ningbo (CN)

( * ) Notice: Subject to any disclaimer, the term of this patent is extended or adjusted under 35 U.S.C. 154(b) by 0 days.

(21) Appl. No.: 18/053,922

(22) Filed: Nov. 9, 2022

(65) Prior Publication Data

US 2023/0339530 A1 Oct. 26, 2023

(30) Foreign Application Priority Data

Apr. 24, 2022 (CN) .......................... 202210443289.9

(51) Int. Cl.
*B62B 3/02* (2006.01)
*B62B 5/06* (2006.01)
*B62B 3/06* (2006.01)

(52) U.S. Cl.
CPC ................ *B62B 5/067* (2013.01); *B62B 3/02* (2013.01); *B62B 3/0606* (2013.01); *B62B 3/0618* (2013.01); *B62B 2202/10* (2013.01); *B62B 2205/20* (2013.01)

(58) Field of Classification Search
CPC ......... B62B 5/067; B62B 3/02; B62B 3/0606; B62B 3/0618; B62B 2202/10; B62B 2205/20; B62B 2207/04
USPC ..................................................... 280/43.12
See application file for complete search history.

(56) References Cited

U.S. PATENT DOCUMENTS

| | | | | |
|---|---|---|---|---|
| 3,567,240 A | * | 3/1971 | Brassington | B66F 3/42 280/43.23 |
| 5,403,024 A | * | 4/1995 | Frketic | B62B 3/008 280/43.12 |
| 5,951,234 A | * | 9/1999 | Johansson | B62B 3/0625 280/43.12 |
| 8,979,099 B1 | * | 3/2015 | Ellis | B66F 9/142 280/43.12 |
| 10,014,141 B1 | * | 7/2018 | Zheng | B62B 3/0618 |

(Continued)

FOREIGN PATENT DOCUMENTS

| CN | 109384174 B | 7/2020 |
|---|---|---|
| CN | 212609370 U | 2/2021 |
| CN | 215854927 U | 2/2022 |

*Primary Examiner* — James A Shriver, II
*Assistant Examiner* — Hilary L Johns
(74) *Attorney, Agent, or Firm* — INNOVATION CAPITAL LAW GROUP, LLP; Vic Lin

(57) ABSTRACT

A folding pallet truck comprises a frame module, a lifting module installed on the frame module and comprising a mount, and a handle module comprising a tube in rotating fit with the mount, wherein a first constraint part is formed between an end, rotatably connected to the mount, of the tube and the mount, and the handle module is folded by detaching the first constraint part or is unfolded by reassembling the first constraint part. The handle module can be folded to be stored or be unfolded and locked to be used by detaching or reassembling the first constraint part formed between the tube of the handle module and the mount of the lifting module, operation is easy, and the pallet truck has a small size when stored.

11 Claims, 7 Drawing Sheets

(56) References Cited

U.S. PATENT DOCUMENTS

| | | | |
|---|---|---|---|
| 10,640,348 B2* | 5/2020 | Pan | B66F 17/003 |
| 11,142,232 B2* | 10/2021 | Dusa, II | B62B 5/0079 |
| 2016/0023872 A1* | 1/2016 | Liu | B62B 3/0618 |
| | | | 60/413 |
| 2018/0190454 A1* | 7/2018 | Zheng | H01H 36/0006 |
| 2018/0334368 A1* | 11/2018 | Pan | B60T 13/748 |
| 2020/0331734 A1* | 10/2020 | Zhou | B62B 3/0612 |
| 2021/0031821 A1* | 2/2021 | Dusa, II | B66F 9/07559 |
| 2022/0410957 A1* | 12/2022 | Ke | B62B 3/0618 |

* cited by examiner

FOLDING PALLET TRUCK

BACKGROUND OF THE INVENTION

1. Technical Field

The invention belongs to the technical field of pallet trucks, and particularly relates to a folding pallet truck.

2. Description of Related Art

Pallet trucks, as indispensable auxiliary equipment for transferring materials, are mainly used for short-distance transportation of materials. However, common pallet trucks cannot be folded and have a large size when transported, thus increasing the transportation cost.

BRIEF SUMMARY OF THE INVENTION

The objective of the invention is to overcome the aforementioned problems of the prior art by providing a folding pallet truck.

The objective of the invention may be realized through the following technical solution: a folding pallet truck comprises:

A frame module, which comprises fork structures and an upright column connected to one end of the fork structures and integrated with the fork structures, wherein a support arm and a top plate extend from the upright column in a direction away from the fork structures, the top plate is located above the support arm in a lifting direction of the fork structures, and a support seat is connected to the support arm;

A lifting module, which comprises a jack assembly installed on the support seat and a mount provided with a first rotating shaft, a second rotating shaft and a third rotating shaft, wherein an output end of the jack assembly is connected to the top plate, the jack assembly drives the top plate to move upwards and downwards, the third rotating shaft is in rotating fit with the jack assembly, and the second rotating shaft abuts against an input end of the jack assembly; and A handle module, which comprises a tube in rotating fit with the mount through the first rotating shaft, wherein a first constraint part is formed between an end, rotatably connected to the mount, of the tube and the mount, and the handle module is folded by detaching the first constraint part or is unfolded by reassembling the first constraint part.

According to the folding pallet truck, when the first constraint part is detached, a single constraint position is formed between the tube and the mount, and the tube rotates around the mount through the first rotating shaft; and when the first constraint part is reassembled, two constraint positions are formed between the tube and the mount, relative positions of the tube and the mount are fixed, and the tube and the mount synchronously rotate around the jack assembly through the third rotating shaft.

According to the folding pallet truck, when the first constraint part is detached, the single constraint position is formed between the tube and the mount, and the tube rotates around the mount through the first rotating shaft to be in contact with an upper surface of the upright column, wherein the upper surface of the upright column is a surface, away from the fork structures, of the upright column, and the handle module is supported by the upright column in the lifting direction of the fork structures; and when the first constraint part is reassembled, the two constraint positions are formed between the tube and the mount, the relative positions of the tube and the mount are fixed, and the tube and the mount synchronously rotate around the jack assembly.

According to the folding pallet truck, the first constraint part comprises a first bracket, which is installed on the mount and is U-shaped, wherein the first bracket is open in a direction identical with the lifting direction of the fork structures, and first constraint holes are formed in an open end of the first support; a second constraint hole is formed in the tube; and when the first constraint holes are coaxial with the second constraint hole, a bolt is synchronously inserted into the first constraint holes and the second constraint hole to fix the relative positions of the tube and the mount.

According to the folding pallet truck, a second constraint part is formed between the tube close to the end rotatably connected to the mount and the upright column, wherein the handle module is locked in a folded state by reassembling the second constraint part or is unlocked to rotate around the mount through the first rotating shaft by detaching the second constraint part.

According to the folding pallet truck, the second constraint part comprises a second bracket, which is installed on the upright column and is U-shaped, wherein the second bracket is open in a same direction as the first bracket, and third constraint holes are formed in an open end of the second bracket; a fourth constraint hole is formed in the tube; and when the third constraint holes are coaxial with the fourth constraint hole, the bolt is synchronously inserted into the third constraint holes and the fourth constraint hole to fix relative positions of the tube and the upright column.

According to the folding pallet truck, the first constraint part and the second constraint part share the bolt, wherein when the bolt is pulled out of the first constraint holes and the second constrain hole and is inserted into the third constraint holes and the fourth constraint hole, the first constraint part is detached, and the second constraint part is reassembled and locked; and when the bolt is pulled out of the third constraint holes and the fourth constraint hole and is inserted into the first constraint holes and the second constrain hole, the first constraint part is reassembled and locked, and the second constraint part is detached.

According to the folding pallet truck, each fork structure comprises a first fork, and a second fork which extends in a lengthwise direction of the first fork and is in rotating fit with the first fork, wherein a first loading plane is disposed on the first fork, a second loading plane is disposed on the second fork, the first fork and the second fork are able to rotate relatively to change an angle formed between the first loading plane and the second loading plane, and the angle ranges from 40° to 180°.

According to the folding pallet truck, the first fork and the second fork are connected through a rotating structure, wherein the rotating structure comprises a first rotating block connected to the first fork and a second rotating block connected to the second fork, and a pin shaft around which the first rotating block and the second rotating block rotate relatively, and a locking part for fixing relative positions of the first rotating block and the second rotating block are disposed between the first rotating block and the second rotating block.

According to the folding pallet truck, the locking part comprises a pin, which has an end screwed onto the second rotating block and locked through a nut, as well as an end clamped into one hole in the first rotating block, wherein two holes, namely a first hole and a second hole, are formed in the first rotating block; when the pin is clamped into the first hole, the first loading plane and the second loading plane are located on a same horizontal plane; and when the pin is clamped into the second hole, the angle ranging from 40° to 180° is formed between the first loading plane and the second loading plane.

According to the folding pallet truck, first shaft hole is formed in the pin shaft, a second shaft hole is formed in the second rotating block, the first shaft hole is coaxial with the second shaft hole, and a pin is synchronously inserted into the first shaft hole and the second shaft hole to fix the second rotating block and the pin shaft.

According to the folding pallet truck, the pallet truck is a manual pallet truck or an electrical pallet truck.

According to the folding pallet truck, an elastic bead is disposed at an end, clamped into one of the holes, of the pin and is able to move in an axis direction of the pin.

Compared with the prior art, the invention has the following beneficial effects:
(1) According to the folding pallet truck, the handle module can be folded to be stored or be unfolded and locked to be used by detaching or reassembling the first constraint part formed between the tube of the handle module and the mount of the lifting module, operation is easy, and the pallet truck has a small size when stored.
(2) The second constraint part is arranged to prevent the handle module from moving upwards and downwards due to bumping when the pallet truck is transported in the folded state, such that collisions between the handle module and the upright column are avoided, and the reliability of the pallet truck during the transport process is improved; in addition, the first constraint part and the second constraint part are basically identical in structure, which makes it possible to share one bolt, facilitating the management of parts.
(3) The second fork is used as an extended section of the first fork in the lengthwise direction, such that long goods can be transported by the pallet truck; the second fork is rotatably connected to the first fork, such that the storage size of the pallet truck will not be increased with the increase of the length of the fork structure of the pallet truck, and when the pallet truck is used for transporting short goods, the second fork can be turned to stop and block the goods on the first fork in the lengthwise direction, thus improving the reliability of the goods during transportation.

In the figures: 100, frame module; 110, fork structure; 111, first fork; 112, second fork; 113, first loading plane; 114, second loading plane; 120, upright column; 130, support arm; 140, top plate; 150, support seat; 160, rotating structure; 161, first rotating block; 1611, first hole; 1612, second hole; 162, second rotating block; 1621, second shaft hole; 163, pin shaft; 1631, first shaft hole; 164, locking part; 1641, pin; 1642, nut; 1643, elastic bead; 200, traveling module; 210, first traveling wheel; 220, second traveling wheel; 300, lifting module; 310, jack assembly; 311, valve trim; 312, support frame; 320, mount; 321, first rotating shaft; 322, second rotating shaft; 323, third rotating shaft; 400, handle module; 410, tube; 500, first constraint portion; 510, first bracket; 520, first constraint hole; 530, second constraint hole; 540, bolt; 600, second constraint part; 610, second bracket; 620, third constraint hole; 630, fourth constraint hole.

DETAILED DESCRIPTION OF THE INVENTION

The technical solutions of the invention will be further described below in conjunction with specific embodiments and accompanying drawings of the invention, but the invention is not limited to the following embodiments.

It should be noted that, all directional instructions (such as "upper", "lower", "left", "right", "front", and "back") in the embodiments of the invention are merely used to explain relative positional relations or motion states of elements under a certain pose (shown in the figures), and if the specific pose changes, the directional instructions will change accordingly.

Figure 1:
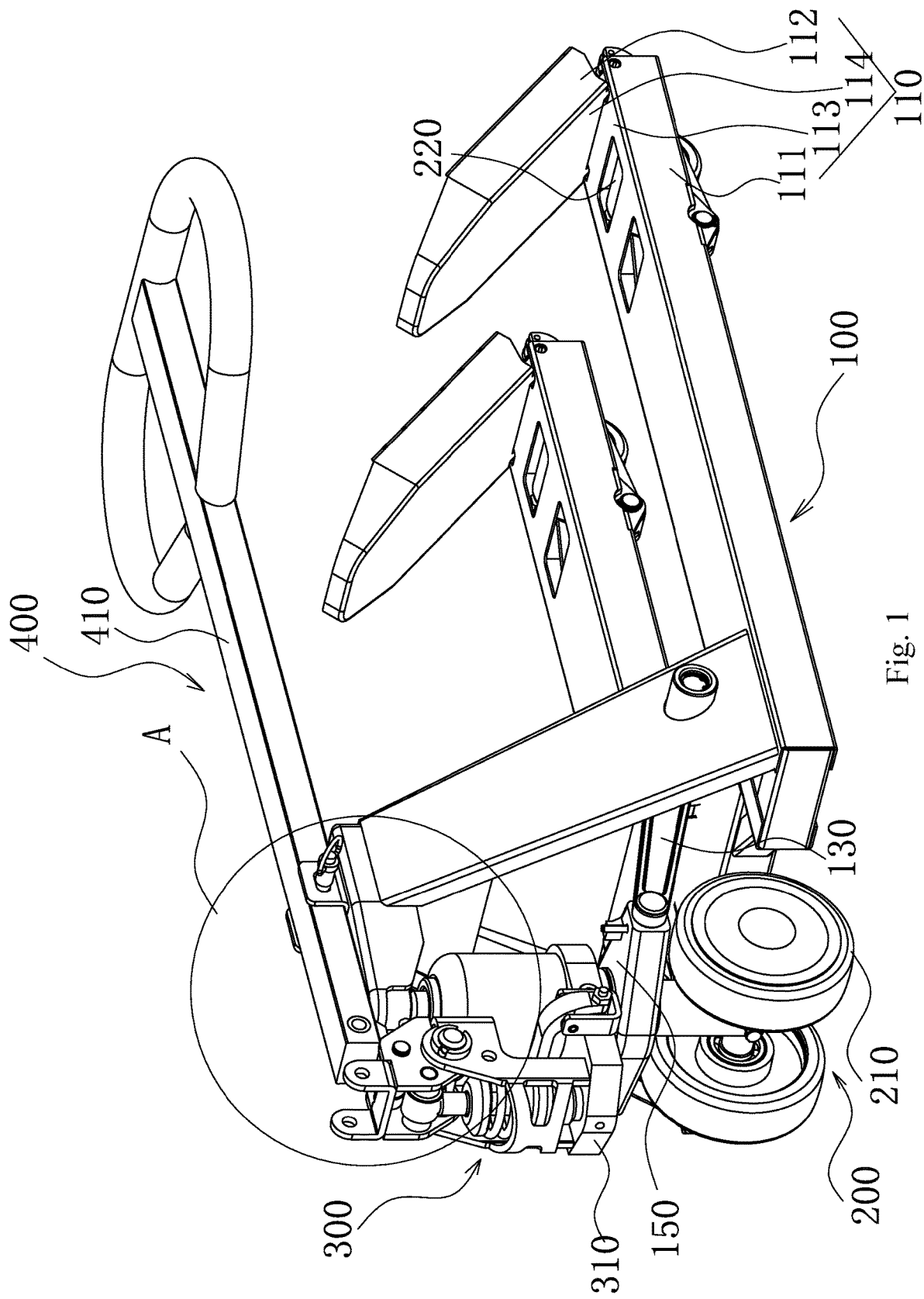
FIG. 1 is a structural view of a folding pallet truck in a folded state according to the invention.
Figure 2:
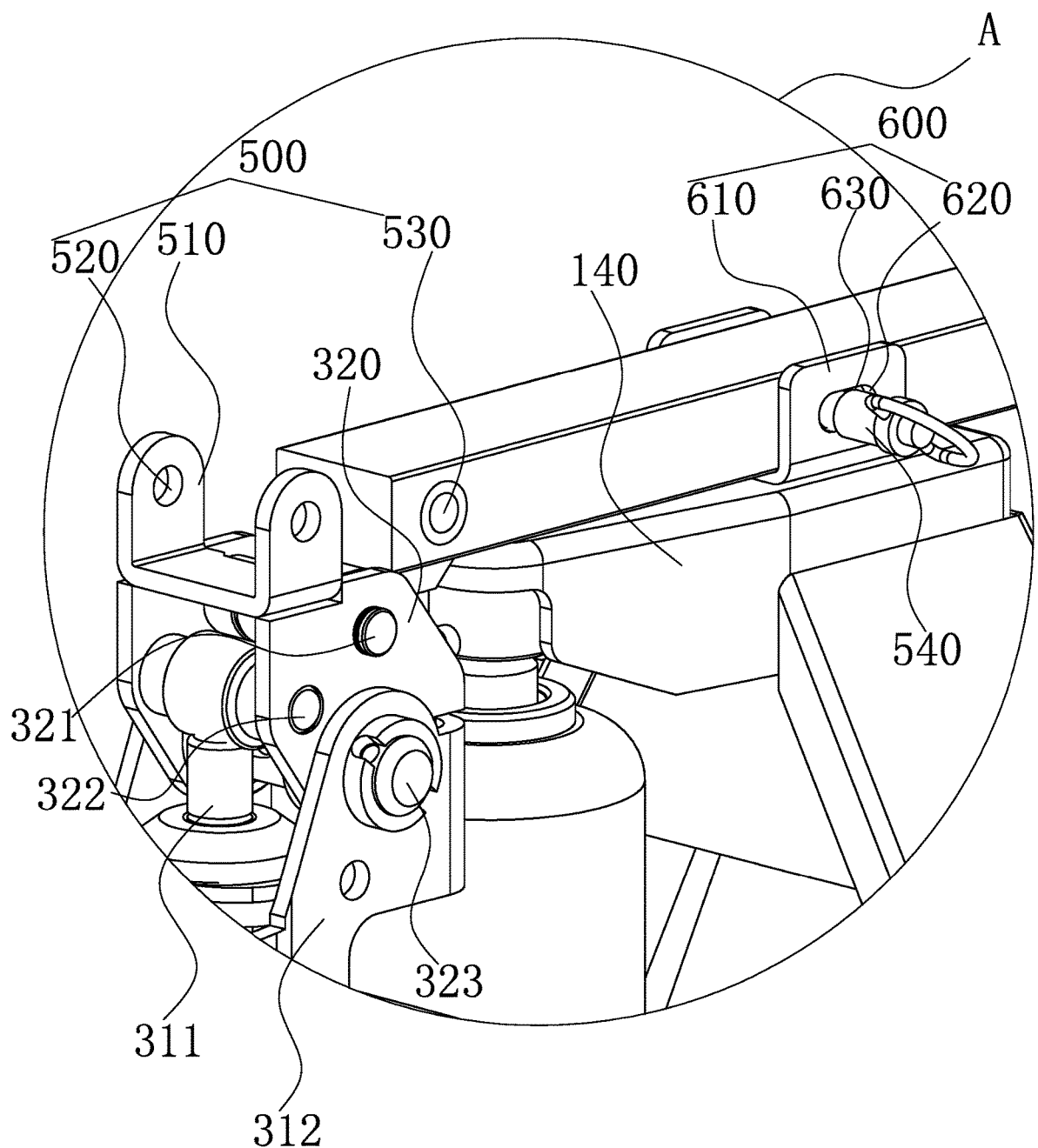
FIG. 2 is an enlarged view of part A in FIG. 1.
Figure 3:
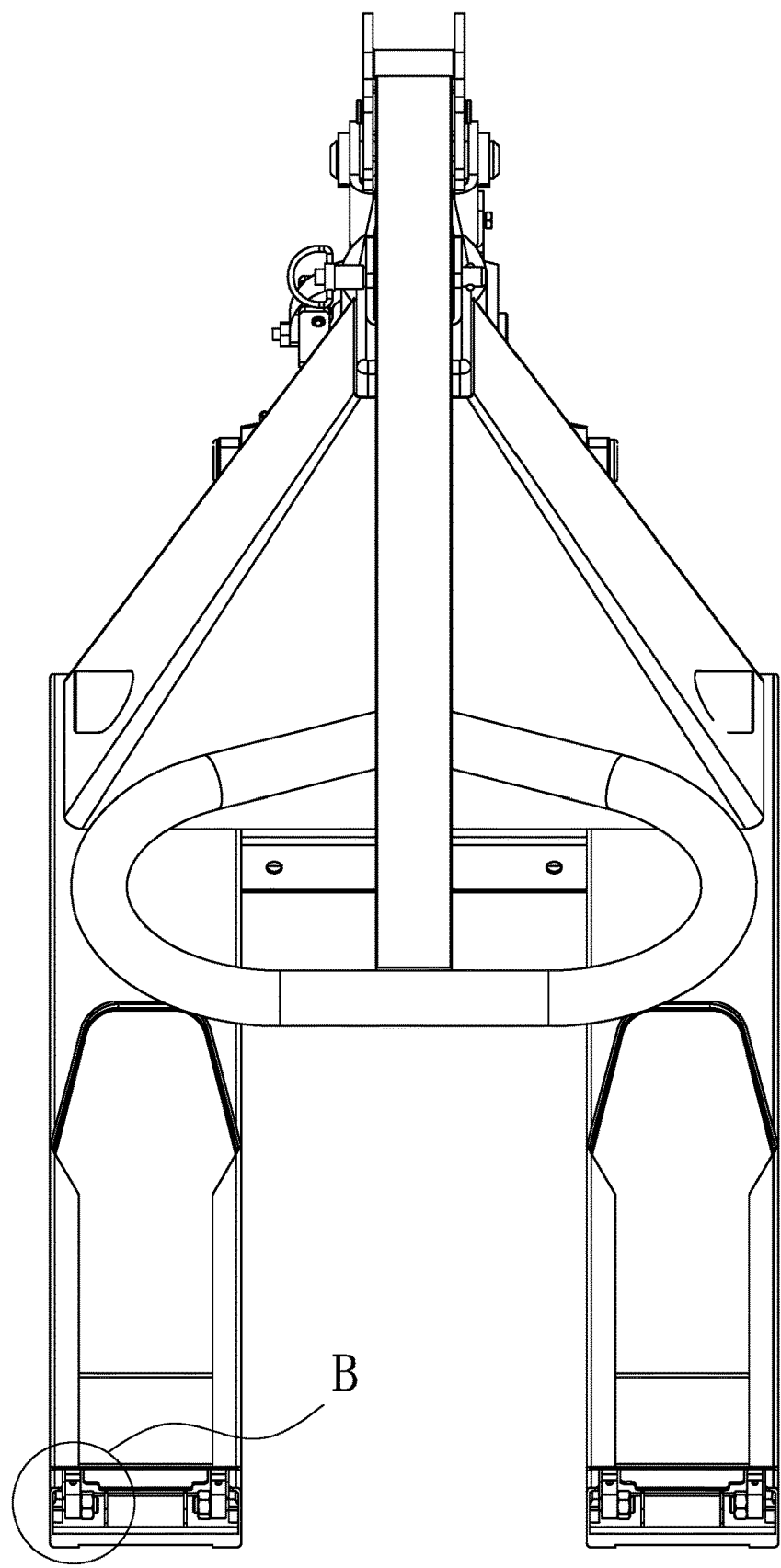
FIG. 3 is a structural view of the folding pallet truck in the folded state in FIG. 1 from another perspective.
Figure 4:
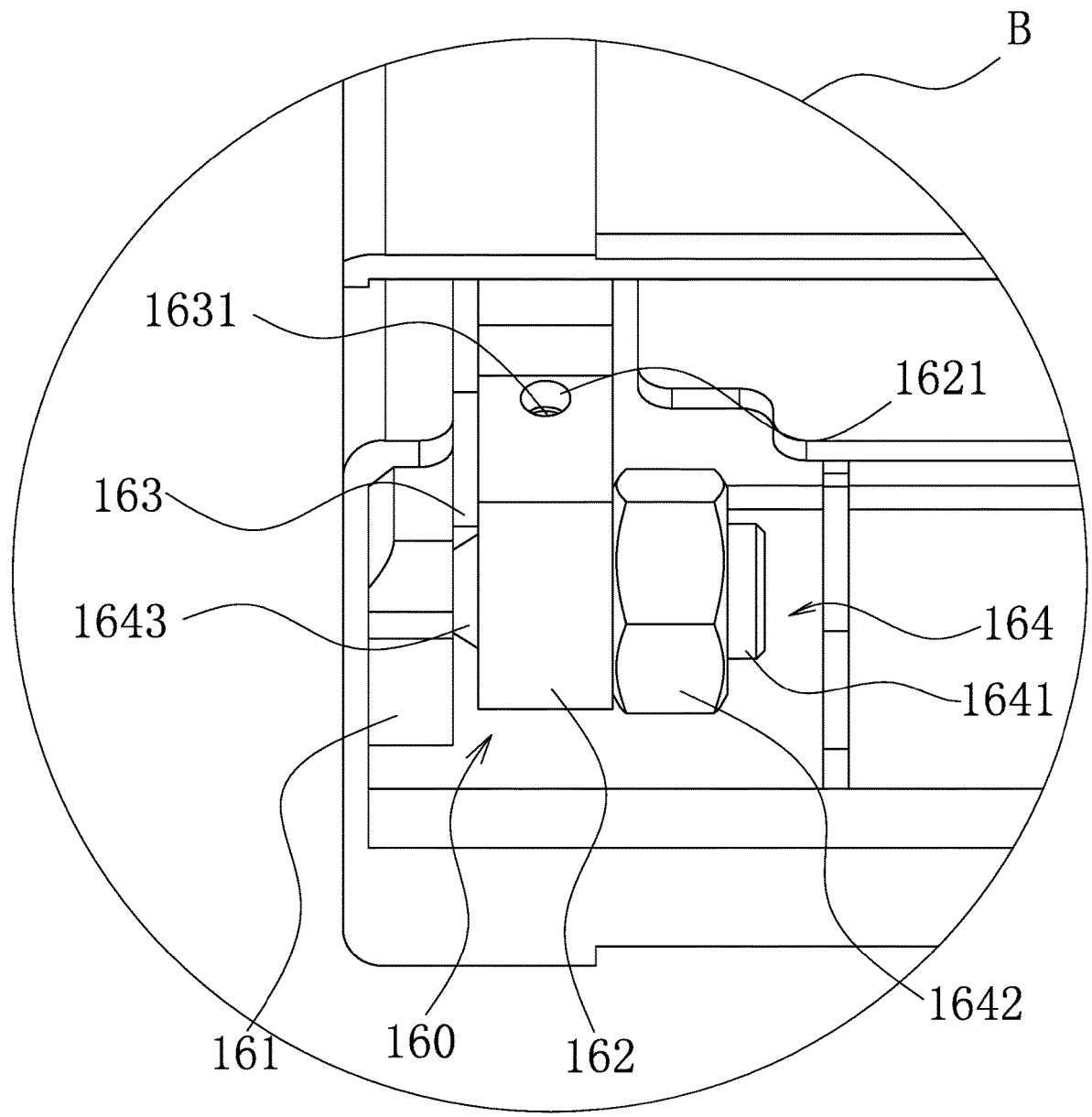
FIG. 4 is an enlarged view of part B in FIG. 3.
Figure 5:
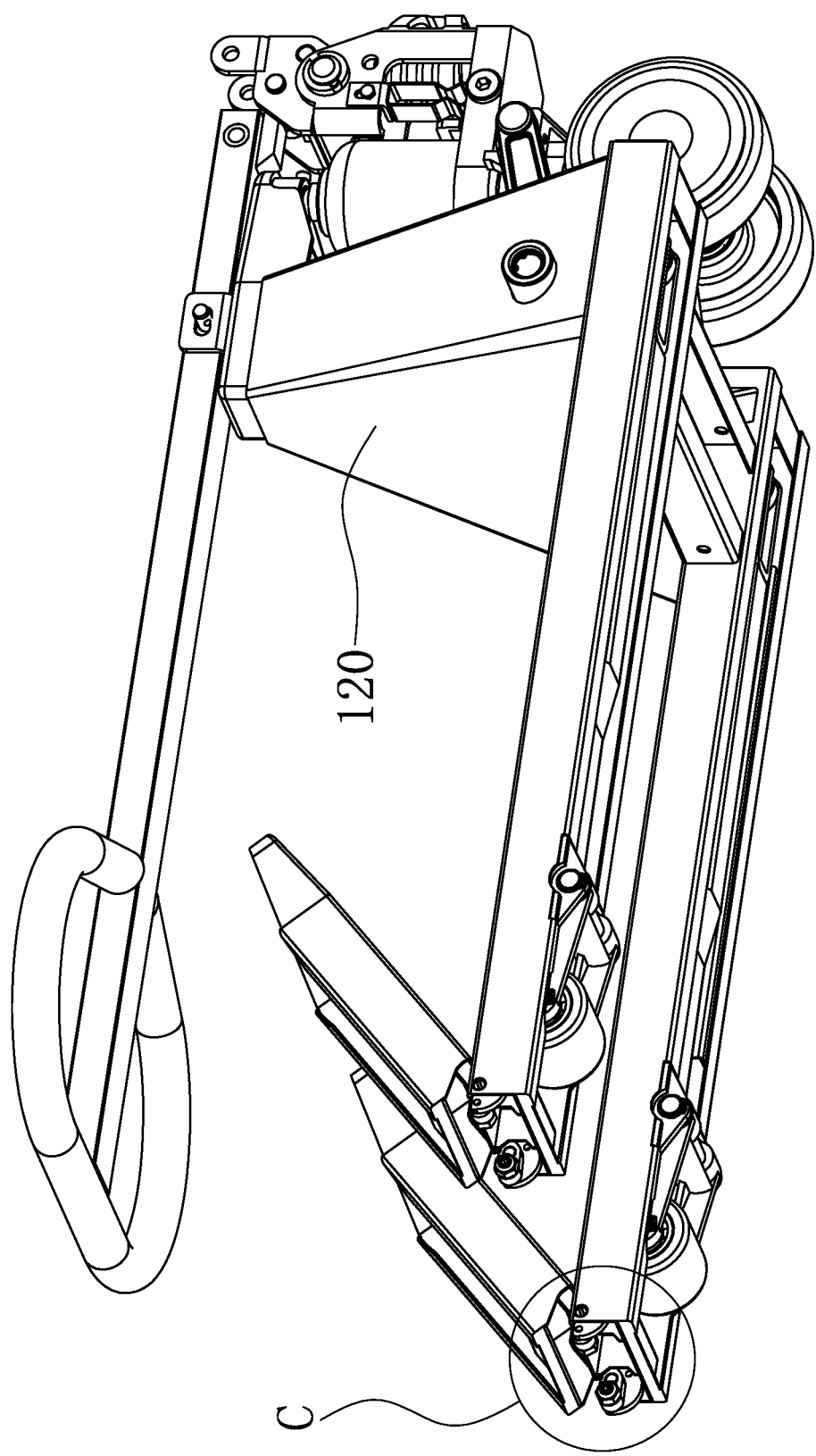
FIG. 5 is a structural view of the folding pallet truck in the folded state in FIG. 1 from third perspective.
Figure 6:
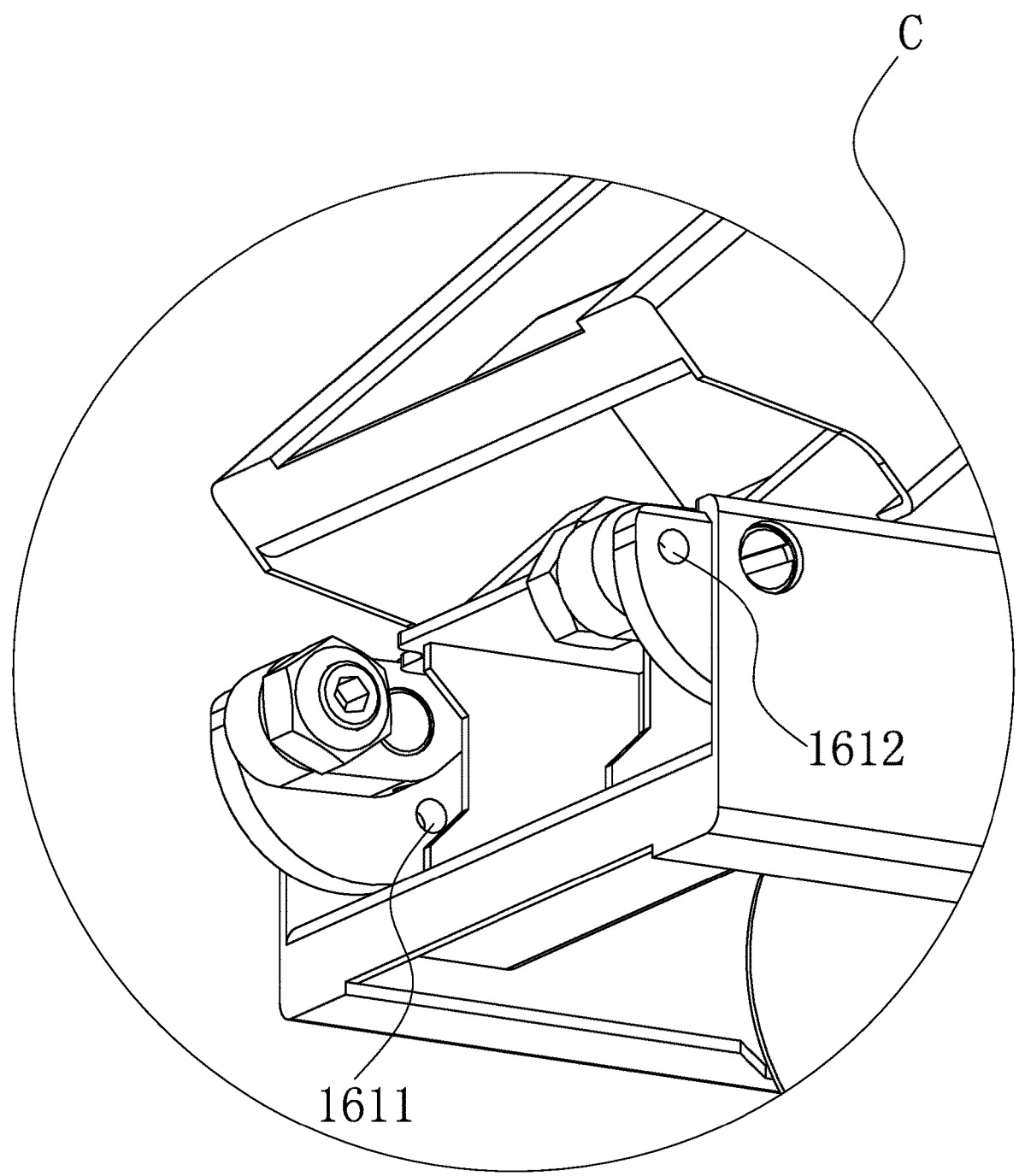
FIG. 6 is an enlarged view of part C in FIG. 5.
Figure 7:
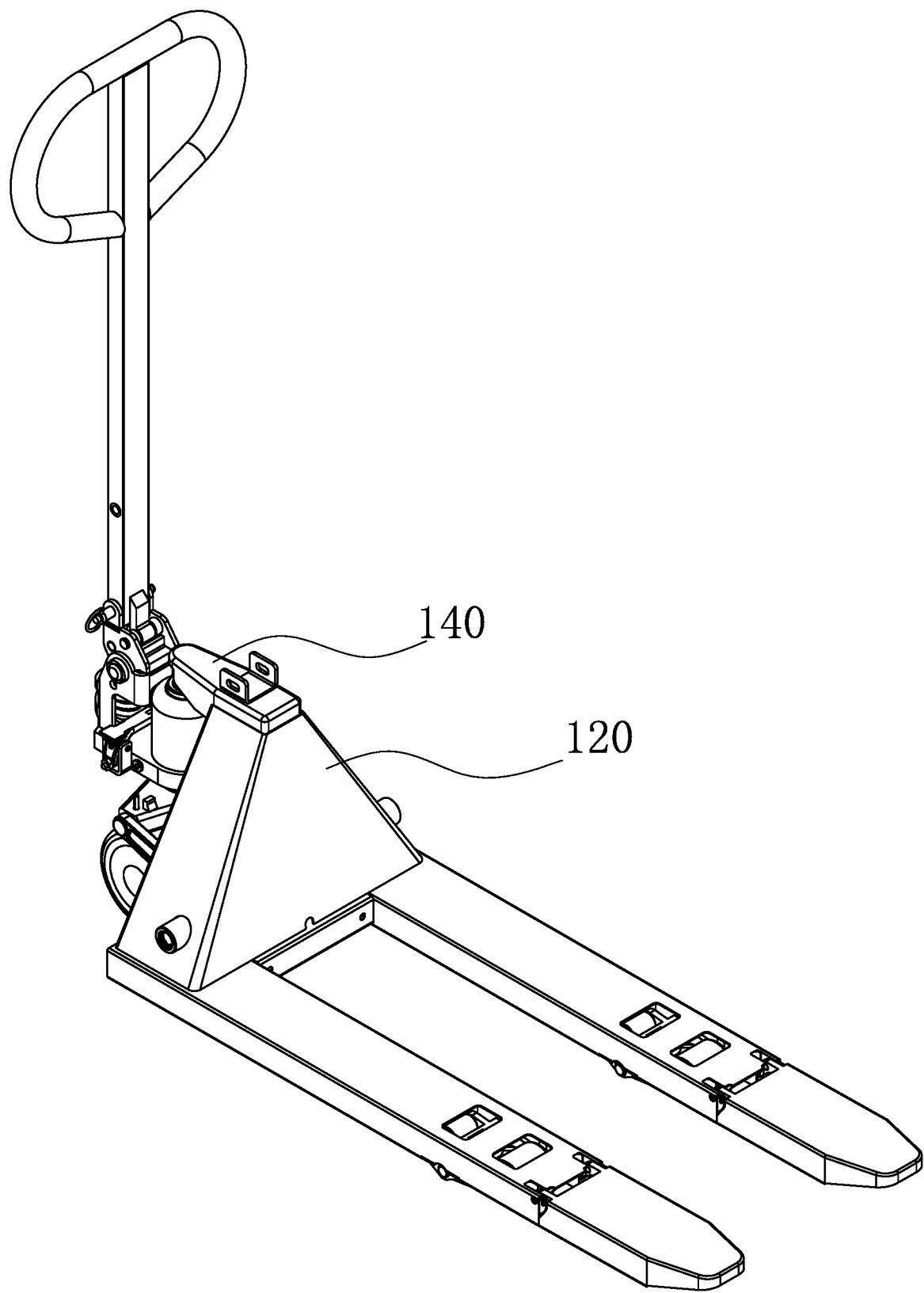
FIG. 7 is a structural view of the folding pallet truck in an unfolded state according to the invention.

As shown in FIG. 1-FIG. 7, the invention provides a folding pallet truck, comprising:

A frame module 100, which comprises fork structures 110 and an upright column 120 connected to one end of the fork structures 110 and integrated with the fork structures 110, wherein a support arm 130 and a top plate 140 extend from the upright column 120 in a direction away from the fork structures 110, the top plate 140 is located above the support arm 130 in a lifting direction of the fork structures 110, and a support seat 150 is connected to the support arm 130;

A traveling module 200, which comprises first traveling wheels 210 connected to the support seat 150 and second traveling wheels 220 connected to the other end of the fork structures 110;

A lifting module 300, which comprises a jack assembly 310 installed on the support seat 150, wherein an output end of the jack assembly 310 is connected to the top plate 140, the jack assembly 310 drives the top plate 140 to move upwards and downwards, and an input end of the jack assembly 310 is rotatably connected to a mount 320; and A handle module 400, which comprises a tube 410 rotatably connected to the mount 320, wherein a first constraint part 500 is formed between an end, rotatably connected to the mount 320, of the tube 410 and the mount 320, and the handle module 400 is folded by detaching the first constraint part 500 or is unfolded by reassembling the first constraint part 500.

According to the folding pallet truck provided by the invention, the handle module 400 can be folded to be stored or be unfolded and locked to be used by detaching or reassembling the first constraint part 500 formed between the tube 410 of the handle module 400 and the mount 320 of the lifting module 300, operation is easy, and the pallet truck has a small size when stored.

It should be pointed out that, when the handle module 400 is unfolded, two constraint positions are formed by the first constraint part 500 between the tube 410 and the mount 320, as well as the rotating fit between the tube 410 and the mount 320, such that the relative positions of the mount 320 and the tube 410 are fixed; at this moment, if the fork structures 110 of the pallet truck need to be lifted, the handle module 400 and the mount 320 synchronously rotate around the jack assembly 310 to lift the fork structures 110; if the fork structures 110 of the pallet truck need to be lowered and the pallet truck is a manual pallet truck, a switch at the other end of the tube 410 of the handle module 400 is pressed to lower the fork structures 110. When the handle module 400 is folded, the first constraint part 500 between the tube 410 and the mount 320 is detached, and only the constraint position that can realize relative rotation between the tube 410 and the mount 320 is left.

In addition, the pallet truck in this embodiment may be a manual pallet truck or an electrical pallet truck.

Preferably, when the first constraint part 500 is detached, a single constraint position is formed between the tube 410 and the mount 320, so the tube 410 and the mount 320 can rotate relatively, and the tube 410 can rotate with respect to the mount 320 to be in contact with an upper surface of the upright column 120, wherein the upper surface of the upright column 120 is a surface, away from the fork structures 110, of the upright column 120, and the handle module 400 is supported by the upright column 120 in the lifting direction of the fork structures 110; when the first constrain part 500 is reassembled and locked, two constraint positions are formed between the tube 410 and the mount 320, the relative positions of the tube 410 and the mount 320 are fixed, and the tube 410 and the mount 320 can synchronously rotate around the jack assembly 310.

Further preferably, a second constraint part 600 is formed between the tube 410 close to the end rotatably connected to the mount 320 and the upright column 120, wherein when the first constraint part 500 is detached and the second constraint part 600 is reassembled and locked, the handle module 400 is in a folded state and can be stored; and when the second constraint part 600 is detached and the first constraint part 500 is reassembled and locked, the handle module 400 is in an unfolded state and can be used.

Preferably, the first constraint part 500 comprises a first bracket 510, which is installed on the mount 320 and is U-shaped, wherein the first bracket 510 is open upwards, which is identical with the lifting direction of the fork structures 110, and first constraint holes 520 are formed in an open end of the first bracket 510; a second constraint hole 530 is formed in the tube 410; and when the first constraint holes 520 are coaxial with the second constraint hole 530, a bolt 540 is synchronously inserted into the first constraint holes 520 and the second constraint hole 530 to fix the relative positions of the tube 410 and the mount 320.

It should be pointed out that, in order to release the tube 410 and the mount 320, the bolt 540 is pulled out of the first constraint holes 520 and the second constraint hole 530, and then the tube 410 can rotate around the mount 320 to fold the handle module 400.

Preferably, the second constraint part 600 comprises a second bracket 610, which is installed on the upright column 120 and is U-shaped, wherein the second bracket 610 is open upwards, which is identical with the first bracket 510, and third constraint holes 620 are formed in an open end of the second bracket 610; a fourth constraint hole 630 is formed in the tube 410; and when the third constraint holes 620 are coaxial with the fourth constraint hole 630, the bolt 540 is synchronously inserted into the third constraint holes 620 and the fourth constraint hole 630 to fix the relative positions of the tube 410 and the upright column 120.

It should be pointed out that the tube 410 and the upright column 120 can be released in the same way as the tube 410 and the mount 320, which will no longer be detailed here.

In addition, to ensure that the bolt 540 can be synchronously inserted into the third constraint holes 620 and the fourth constraint hole 630, the third constraint holes 620 are long circular holes.

Further, the first constraint part 500 and the second constraint part 600 can share the bolt 540, wherein when pulled out of the first constraint holes 520 and the second constrain hole 530 to release the first constraint part 500, the bolt 540 is inserted into the third constraint holes 620 and the fourth constraint hole 630 to reassemble the second constraint part 600, and in this case, the handle module 400 is folded to be stored; and when pulled out of the third constraint holes 620 and the fourth constraint hole 630 to release the second constraint part 600, the bolt 540 is inserted into the first constraint holes 520 and the second constraint hole 530 to reassemble the first constraint part 500, and in this case, the handle module 400 is unfolded.

In this embodiment, the second constraint part 600 is arranged to prevent the handle module 400 from moving upwards and downwards due to bumping when the pallet truck is transported in the folded state, such that collisions between the handle module 400 and the upright column 120 are avoided, and the reliability of the pallet truck during the transport process is improved; in addition, the first constraint part 500 and the second constraint part 600 are basically identical in structure, which makes it possible to share one bolt 540, facilitating the management of parts.

Preferably, a first rotating shaft 321, a second rotating shaft 322 and a third rotating shaft 323 are disposed on the mount 320, the first rotating shaft 321 is in rotating fit with the tube 410, the second rotating shaft 322 is in press fit with a valve trim 311 in the jack assembly 310, and the third rotating shaft 323 is in rotating fit with a support frame 312 in the jack assembly 310, wherein the first rotating shaft 321 functions as a fulcrum around which the tube 410 rotates to fold or unfold the handle module 400 when the first constraint part 500 is released or reassembled, and also functions as one constraint position for fixing the mount 320 and the tube 410 when the first constraint part 500 is reassembled, so as to prevent the mount 320 and the tube 410 from rotating when the mount 320 and the support frame 312 rotate relatively; and the second rotating shaft 322 provides power for continuously pressing the valve trim 311 when the mount 320 and the tube 410 rotate synchronously around the support frame 312, so as to lift the fork structures 110.

Preferably, each fork structure 110 comprises a first fork 111 and a second fork 112 which are able to rotate relatively, wherein a first loading plane 113 and a second loading plane 114 are disposed on the first fork 111 and the second fork 112 respectively, the first fork 111 and the second fork 112 are able to rotate relatively to change an angle formed between the first loading plane 113 and the second loading plane 114, and the angle ranges from 40° to 180°.

It should be pointed out that, when goods transported by the pallet truck are too long, the second fork 112 can be unfolded to be flush with the first fork 111, that is, the first loading plane 113 and the second loading plane 114 are located on the same plane; when the goods transported by the pallet truck are short, the second fork 112 can be folded to be perpendicular to the first fork 111, that is, an angle ranging from 40° to 180° is formed between the first loading plane 113 and the second loading plane 114.

In this embodiment, the second fork 112 is used as an extended section of the first fork 111 in the lengthwise direction, such that long goods can be transported by the pallet truck; the second fork 112 is rotatably connected to the first fork 111, such that the storage size of the pallet truck will not be increased with the increase of the length of the fork structure 110 of the pallet truck, and when the pallet truck is used for transporting short goods, the second fork 112 can be turned to stop and block the goods on the first fork 111 in the lengthwise direction, thus improving the stability of the goods during transportation.

Further preferably, the first fork 111 and the second fork 112 are connected through a rotating structure 160, wherein the rotating structure 160 comprises a first rotating block 161 connected to the first fork 111 and a second rotating block 162 connected to the second fork 112, and a pin shaft 163 around which the first rotating block 161 and the second rotating block 162 rotate relatively, and a locking part 164 for fixing the relative positions of the first rotating block 161 and the second rotating block 162 are disposed between the first rotating block 161 and the second rotating block 162.

It should be pointed out that, in order to prevent the second rotating block 162 connected to the second fork 112 from rotating with respect to the pin shaft 163 when the first rotating block 161 and the second rotating block 162 rotate relatively, the second rotating block 162 and the pin shaft 163 are fixed relatively in the following way: a first shaft hole 1631 is formed in the pin shaft 163, a second shaft hole 1621 is formed in the second rotating block 162, the first shaft hole 1631 is coaxial with the second shaft hole 1621, and a pin is synchronously inserted into the first shaft hole 1631 and the second shaft hole 1621 to fix the second rotating block 162 and the pin shaft 163.

Preferably, the locking part 164 comprises a pin 1641, which has an end screwed onto the second rotating block 162 and locked through a nut 1642, as well as an end clamped into a hole in the first rotating block 161, wherein an elastic bead 1643 is disposed on the pin 1641 and is able to move in an axis direction of the pin 1641.

It should be pointed that, two holes, namely a first hole 1611 and a second hole 1612, are formed in the first rotating block 161; when the elastic bead 1643 is clamped into the first hole 1611, the first fork 111 is flush with the second fork 112; when the elastic bead 1643 is clamped into the second hole 1612, the first fork 111 is perpendicular to the second fork 112; wherein, when the second rotating block 162 and the first rotating block 161 rotate relatively, the elastic bead 1643 rolls from the first hole 1611 into the second hole 1612.

It should be noted that, the descriptions such as "first", "second", or "one" in the specification is merely for a descriptive purpose, and should not be construed as indicating or implying relative importance or implicitly indicating the number of technical features referred to. So, a feature defined by "first" or "second" may explicitly or implicitly refer to the inclusion of at least one said feature. In the description of the invention, "multiple" means at least two, such as two or three, unless otherwise clearly defined. Terms such as "connect" and "fix" should be broadly understood. For example, "connect" may refer to fixed connection, detachable connection or integrated connection; or, mechanical connection or electrical connection; or, direct connection, indirect connection through an intermediate medium, or internal communication or interaction of two elements, unless otherwise clearly defined. Those ordinarily skilled in the art can understand the specific meanings of these terms in the invention as the case may be.

In addition, the technical solutions of the embodiments of the invention can be combined under the preconditions that the combinations can be implemented by those ordinarily skilled in the art. Any combinations of the technical solutions that may cause conflicts or cannot be implemented should be considered as non-existent and should not fall within the protection scope of the invention.

The specific embodiments described in this specification are merely used to explain the spirit of the invention by way of examples. Those ordinarily skilled in the art can make various amendments, supplements, or similar substitutions to these specific embodiments without departing from the spirit of the invention or exceeding the scope defined by the appended claims.

What is claimed is:

1. A folding pallet truck, comprising:
   a frame module, which comprises fork structures and an upright column connected to one end of the fork structures and integrated with the fork structures, wherein a support arm and a top plate extend from the upright column in a direction away from the fork structures, the top plate is located above the support arm in a lifting direction of the fork structures, and a support seat is connected to the support arm;
   a lifting module, which comprises a jack assembly installed on the support seat and a mount provided with a first rotating shaft, a second rotating shaft and a third rotating shaft, wherein an output end of the jack assembly is connected to the top plate, the jack assembly drives the top plate to move upwards and downwards, the third rotating shaft is in rotating fit with the jack assembly, and the second rotating shaft abuts against an input end of the jack assembly; and
   a handle module, which comprises a tube in rotating fit with the mount through the first rotating shaft, wherein a first constraint part is formed between an end, rotatably connected to the mount, of the tube and the mount, and the handle module is folded by detaching the first constraint part or is unfolded by reassembling the first constraint part;
   when the first constraint part is detached, a single constraint position is formed between the tube and the mount, and the tube rotates around the mount through the first rotating shaft; and when the first constraint part is reassembled, two constraint positions are formed between the tube and the mount, relative positions of the tube and the mount are fixed, and the tube and the mount synchronously rotate around the jack assembly through the third rotating shaft.

2. The folding pallet truck according to claim 1, wherein when the first constraint part is detached, the single constraint position is formed between the tube and the mount, and the tube rotates around the mount through the first rotating shaft to be in contact with an upper surface of the upright column, wherein the upper surface of the upright column is a surface, away from the fork structures, of the upright column, and the handle module is supported by the upright column in the lifting direction of the fork structures; and when the first constraint part is reassembled, the two constraint positions are formed between the tube and the mount, the relative positions of the tube and the mount are fixed, and the tube and the mount synchronously rotate around the jack assembly.

3. The folding pallet truck according to claim 1, wherein the first constraint part comprises a first bracket, which is installed on the mount and is U-shaped, wherein the first bracket is open in a direction identical with the lifting direction of the fork structures, and first constraint holes are formed in an open end of the first support; a second constraint hole is formed in the tube; and when the first constraint holes are coaxial with the second constraint hole, a bolt is synchronously inserted into the first constraint holes and the second constraint hole to fix relative positions of the tube and the mount.

4. The folding pallet truck according to claim 3, wherein a second constraint part is formed between the tube close to the end rotatably connected to the mount and the upright column, wherein the handle module is locked in a folded state by reassembling the second constraint part or is unlocked to rotate around the mount through the first rotating shaft by detaching the second constraint part.

5. The folding pallet truck according to claim 4, wherein the second constraint part comprises a second bracket, which is installed on the upright column and is U-shaped, wherein the second bracket is open in a same direction as the first bracket, and third constraint holes are formed in an open end of the second bracket; a fourth constraint hole is formed in the tube; and when the third constraint holes are coaxial with the fourth constraint hole, the bolt is synchronously inserted into the third constraint holes and the fourth constraint hole to fix relative positions of the tube and the upright column.

6. The folding pallet truck according to claim 5, wherein the first constraint part and the second constraint part share the bolt, wherein when the bolt is pulled out of the first constraint holes and the second constrain hole and is inserted into the third constraint holes and the fourth constraint hole, the first constraint part is detached, and the second constraint part is reassembled and locked; and when the bolt is pulled out of the third constraint holes and the fourth constraint hole and is inserted into the first constraint holes and the second constrain hole, the first constraint part is reassembled and locked, and the second constraint part is detached.

7. The folding pallet truck according to claim 1, wherein each said fork structure comprises a first fork, and a second fork which extends in a lengthwise direction of the first fork and is in rotating fit with the first fork, wherein a first loading plane is disposed on the first fork, a second loading plane is disposed on the second fork, the first fork and the second fork are able to rotate relatively to change an angle formed between the first loading plane and the second loading plane, and the angle ranges from 40° to 180°.

8. The folding pallet truck according to claim 7, wherein the first fork and the second fork are connected through a rotating structure, wherein the rotating structure comprises a first rotating block connected to the first fork and a second rotating block connected to the second fork, and a pin shaft around which the first rotating block and the second rotating block rotate relatively, and a locking part for fixing relative positions of the first rotating block and the second rotating block are disposed between the first rotating block and the second rotating block.

9. The folding pallet truck according to claim 8, wherein the locking part comprises a pin, which has an end screwed onto the second rotating block and locked through a nut, as well as an end clamped into one hole in the first rotating block, wherein two holes, namely a first hole and a second hole, are formed in the first rotating block; when the pin is clamped in the first hole, the first loading plane and the second loading plane are located on a same horizontal plane; and when the pin is clamped in the second hole, the angle ranging from 40° to 180° is formed between the first loading plane and the second loading plane.

10. The folding pallet truck according to claim 8, wherein a first shaft hole is formed in the pin shaft, a second shaft hole is formed in the second rotating block, the first shaft hole is coaxial with the second shaft hole, and a pin is synchronously inserted into the first shaft hole and the second shaft hole to fix the second rotating block and the pin shaft.

11. The folding pallet truck according to claim 1, wherein the pallet truck is a manual pallet truck or an electrical pallet truck.

* * * * *